US012017148B2

(12) United States Patent
Douglas et al.

(10) Patent No.: US 12,017,148 B2
(45) Date of Patent: Jun. 25, 2024

(54) USER INTERFACE FOR OPERATING ARTIFICIAL INTELLIGENCE EXPERIMENTS

(71) Applicants: Sony Group Corporation, Tokyo (JP); Sony Corporation of America, New York, NY (US)

(72) Inventors: Rory Douglas, Baltimore, MD (US); Dion Whitehead, San Diego, CA (US); Leon Barrett, Portland, OR (US); Piyush Khandelwal, Austin, TX (US); Thomas Walsh, Melrose, MA (US); Samuel Barrett, Cambridge, MA (US); Kaushik Subramanian, Metzingen (DE); James MacGlashan, Riverside, RI (US); Leilani Gilpin, Santa Cruz, CA (US); Peter Wurman, Acton, MA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/804,716

(22) Filed: May 31, 2022

(65) Prior Publication Data

US 2023/0381660 A1    Nov. 30, 2023

(51) Int. Cl.
*A63F 13/67*    (2014.01)
*A63F 13/573*    (2014.01)
*A63F 13/803*    (2014.01)

(52) U.S. Cl.
CPC ............ *A63F 13/67* (2014.09); *A63F 13/573* (2014.09); *A63F 13/803* (2014.09)

(58) Field of Classification Search
CPC ........ A63F 13/30; A63F 13/33; A63F 13/335; A63F 13/34; A63F 13/35; A63F 13/44;
(Continued)

(56) References Cited

U.S. PATENT DOCUMENTS 10,719,301 B1 *  7/2020  Dasgupta ............. G06V 10/774
11,688,111 B2 *  6/2023  Wang ..................... G06F 3/0481
                                                              715/711
(Continued)

OTHER PUBLICATIONS

Francoise Jules Jules Francoise@Limsi Fr et al: "Marcelle: Composing Interactive Machine Learning Workflows and Interfaces", Proceedings of the 30th ACM International Conference On Multimedia, ACMPUB27, Oct. 10, 2021 (Oct. 10, 2021), pp. 39-53, New York, NY, USA.

(Continued)

*Primary Examiner* — Omkar A Deodhar
(74) *Attorney, Agent, or Firm* — INNOVATION CAPITAL LAW GROUP, LLP; Vic Lin

(57) ABSTRACT

A user interface (UI), for analyzing model training runs, tracking and visualizing various aspects of machine learning experiments, can be used when training an artificial intelligent agent in, for example, a racing game environment. The UI can be web-based and can allow researchers to easily see the status of their experiments. The UI can include an experiment synchronized event viewer that can synchronizes visualizations, videos, and timeline/metrics graphs in the experiment. This viewer allows researchers to see how experiments unfold in great detail. The UI can further include experiment event annotations that can generate event annotations. These annotations can be displayed via the synchronized event viewer. The UI can be used to consider consolidated results across experiments and can further consider videos. For example, the UI can provide a reusable dashboard that can capture and compare metrics across multiple experiments.

10 Claims, 15 Drawing Sheets

(58) Field of Classification Search
CPC .......... A63F 13/45; A63F 13/50; A63F 13/52; A63F 13/56; A63F 13/57; A63F 13/60; A63F 13/63; A63F 13/67; A63F 13/70; A63F 13/798
See application file for complete search history.

(56) References Cited

U.S. PATENT DOCUMENTS

| | | |
|---|---|---|
| 2010/0023151 A1 | 1/2010 | Shieh et al. |
| 2010/0331084 A1* | 12/2010 | Fuzell-Casey .......... A63F 13/69 463/31 |
| 2017/0266568 A1 | 9/2017 | Lucas et al. |
| 2017/0304724 A1* | 10/2017 | Cotter .................... A63F 13/86 |
| 2020/0097847 A1 | 3/2020 | Convertino |
| 2020/0238178 A1* | 7/2020 | Lin .......................... A63F 13/35 |
| 2021/0023453 A1* | 1/2021 | DeVico ................... A63F 13/67 |
| 2021/0060433 A1 | 3/2021 | Projansky |
| 2021/0299573 A1* | 9/2021 | Pourabolghasem .... A63F 13/75 |

OTHER PUBLICATIONS

Justesen Niels et al: "Deep Learning for Video Game Playing", IEEE Transactions On Games, IEEE, vol. 12, No. 1, Feb. 13, 2019 (Feb. 13, 2019), pp. 1-20.
https://polyaxon.com/docs/management/runs-dashboard/comparison/—2021.
https://polyaxon.com/features/—2021.

* cited by examiner

FIG. 1

| Active Runs (total: 138) | | | | | |
|---|---|---|---|---|---|
| ( 1 2 3 4 ... ) | | | | | |
| Rows: 5 ▼ | | | | | |
| gt-220207-ff-loud-yard | florian.fuchs | running | Started 2 hours ago | o1 ●●●●●●● 7.7 ━━━━━━━━━━━ 21 | aws-us-east-1 T cgel-lada R v100 | falcon=maggiore-porsche / tire_consumption_rate=0.1 / tire_wear_max_distribution =uniform(0, 5M) / proj=scaling_difficulty / uvfa-qr-sac versus | versus, qr-sac, 2 cell abs course_v opponent pp w/o is_occupied, skills with split launches and timeouts, relv2, ccc=4 |
| gt-220207-ff-rough envy | florian.fuchs | running | Started 3 hours ago | o1 ●●●●●●● 7.7 ━━━━━━━━━━━ 21 | aws-us-east-1 T cgel-lada R v100 | falcon=maggiore-porsche / tire_consumption_rate=0.1 / tire_wear_max_distribution =uniform(0, 5M) / proj=scaling_difficulty | versus, qr-sac, 2 cell abs course_v opponent pp w/o is_occupied, skills with split launches and timeouts, relv2, ccc=4 |
| gt-220207-ff-orange-foam | florian.fuchs | running | Started 4 hours ago | o1 ●●●●●●● 7.7 ━━ 11 cgel-laxa R v100 | aws-us-east-1 T cgel-laxa R | falcon=maggiore-porsche / qr-sac tire_consumption_rate=0.1 / tw-penalty=6000000 | |
| gt-220207-ff-oval-axle | florian.fuchs | running | Started 4 hours ago | o1 ●●●●●●● 7.7 ━━ 11 | aws-us-east-1 T cgel-laxa R v100 | falcon=maggiore-porsche / qr-sac tire_consumption_rate=0.1 / tw-penalty=5000000 | |
| gt-220207-ff-chic-mat | florian.fuchs | running | Started 4 hours ago | o1 ●●●●●●● 7.7 ━━ 11 | aws-us-east-1 T cgel-laxa R v100 | falcon=maggiore-porsche / qr-sac tire_consumption_rate=0.1 / tw-penalty=3000000 | |

| Finished Runs (total: 34931) | | | | | | |
|---|---|---|---|---|---|---|
| ( 1 2 3 4 ... ) | | | | | | |
| Rows: 5 ▼ | | | | | | |
| ▶ | ▶ | ▶ | ▶ | ▶ | ▶ | ▶ |
| gt-220207-fr-micro-frog | francesco.riccio | success | Started 2 hours ago Duration: | 0 0 ══════20 | cgel-lada RT | eval_scenario=time_trial  multi_eval priority=1  run_alias=maggiore_student_3r_versus  source_run=gt-220125-fr-jumbo-wait  tt-versus-2022-02-distill-maggiore ⓘ | "multi evals in time trial setting" ⓘ |
| gt-220207-fr-sulky-bank | francesco.riccio | success | Started 2 hours ago Duration: | 0 0 ══════20 | cgel-lada RT | backstretch_start  eval_scenario=pursuit  multi_eval priority=1  run_alias=maggiore_student_3r_versus  source_run=gt-220125-fr-jumbo-wait  tt-versus-2022-02-distill-maggiore ⓘ | "multi evals in pursuit setting" ⓘ |
| gt-220207-fr-part-logo | francesco.riccio | success | Started 2 hours ago Duration: | 0 0 ═══10 | cgel-lada RT | eval_scenario=maggiore_holdoff  multi_eval  run_alias=maggiore_student_3r_versus  source_run=gt-220125-fr-jumbo-wait  tt-versus-2022-02-distill-maggiore ⓘ | "Holdoff test on Maggiore" ⓘ |
| gt-220207-fr-dank-ram | francesco.riccio | success | Started 2 hours ago Duration: | 0 0 ═════12 | cgel-lada RT | eval_scenario=maggiore_holdoff  multi_eval  priority=1  run_alias=maggiore_student_3r_versus  source_run=gt-220125-fr-jumbo-wait  tt-versus-2022-02-distill-maggiore ⓘ | "Maggiore Hairpin" ⓘ |
| gt-220207-fr-wimpy-tram | francesco.riccio | success | Started 2 hours ago Duration: | 0 0 ═══10 | cgel-lada RT | eval_scenario=maggiore_holdoff  multi_eval  priority=1  run_alias=maggiore_student_3r_versus  source_run=gt-220125-fr-jumbo-wait  tt-versus-2022-02-distill-maggiore ⓘ | "Section between turns 5-10 at Maggiore with a car 55m ahead and also with no car ahead" ⓘ |

FIG. 4

| Pods status ▼ | | | |
|---|---|---|---|
| trainer-gt-220207-ff-loud-yard-dpfl9 | 2022-02-07 07:58:25-06:00<br>3 hours<br>2022-02-07 10:41:48-06:00 | RUNNING | container "trainer" running | aws-us-east-1 |

Rows: 10 ▼

| | | | | |
|---|---|---|---|---|
| rollout-gt-220207-ff-loud-yard-0-6jkwt | 2022-02-07 07:54:49-06:00<br>3 hours<br>2022-02-07 10:41:55-06:00 | RUNNING | container "trainer" running | cgei-iada |
| rollout-gt-220207-ff-loud-yard-0-7zv2q | 2022-02-07 07:54:49-06:00<br>3 hours<br>2022-02-07 10:41:55-06:00 | RUNNING | container "trainer" running | cgei-iada |
| rollout-gt-220207-ff-loud-yard-0-96vxf | 2022-02-07 07:54:49-06:00<br>3 hours<br>2022-02-07 10:41:55-06:00 | RUNNING | container "trainer" running | cgei-iada |
| rollout-gt-220207-ff-loud-yard-0-c7wvf | 2022-02-07 07:54:49-06:00<br>3 hours<br>2022-02-07 10:41:55-06:00 | RUNNING | container "trainer" running | cgei-iada |
| rollout-gt-220207-ff-loud-yard-0-d5sdq | 2022-02-07 07:54:49-06:00<br>3 hours<br>2022-02-07 10:41:55-06:00 | RUNNING | container "trainer" running | cgei-iada |
| rollout-gt-220207-ff-loud-yard-0-fpv9v | 2022-02-07 07:54:49-06:00<br>3 hours<br>2022-02-07 10:41:55-06:00 | RUNNING | container "trainer" running | cgei-iada |
| rollout-gt-220207-ff-loud-yard-0-g8ft9 | 2022-02-07 07:54:49-06:00<br>3 hours<br>2022-02-07 10:41:55-06:00 | RUNNING | container "trainer" running | cgei-iada |
| rollout-gt-220207-ff-loud-yard-0-gxt7z | 2022-02-07 07:54:49-06:00<br>3 hours | RUNNING | container "trainer" running | cgei-iada |

```
 8  [2022-02-07T16:39:24.136010Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
 9  [2022-02-07T16:38:24.128274Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
10  [2022-02-07T16:38:24.106839Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
11  [2022-02-07T16:37:24.097053Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
12  [2022-02-07T16:37:24.079685Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
13  [2022-02-07T16:36:24.075042Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
14  [2022-02-07T16:36:24.667458Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
15  [2022-02-07T16:36:24.071272Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
16  [2022-02-07T16:35:24.067788Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
17  [2022-02-07T16:35:24.063181Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
18  [2022-02-07T16:34:24.060593Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
19  [2022-02-07T16:34:24.058000Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
20  [2022-02-07T16:33:24.052977Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
21  [2022-02-07T16:33:24.047453Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
22  [2022-02-07T16:32:24.043221Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
23  [2022-02-07T16:32:24.030947Z] reverb_server server=Server(port=2122, reverb_service=ReverbService(chunk_store=chunkStore(size=42047,
    capacity=65535), num_insert_streams=0, table(size=988, capacity=2047, sampler=uniformSelector, remover=Fi
```

≡ | /runs | /gt-220207-ff-yummy-foot | Editing script_1 | X Close | | ▶ | 👤 piyush.khandelwal ▼

▲ Datasource (Metrics ☑)

▼ Script ☑

| ▲ Run | 💾 Save |  | Display as: |
|---|---|---|---|
|  |  |  | Plot (Plot.ly) |

☐ Help ☐ Plot.ly documention

```
 1   //make groups
 2   const groups = { }
 3   for (let i = 0; i < metrics.metric_series.length; ++i)
 4       const run_id metrics.metric_series.length; ++i) {
 5       if (groups [run_id] === undefined) {
 6           groups [run_id] = [ ]
 7       }
 8       groups [run_id] = groups [run_id] .concat (metrics_series
                 [i] .metric_values .map(map(v => [v.x.eval_model_clock
 9   }
10   // sort by x
11   const keys  = object .keys ( groups )
12   for (let i   = 0; i < keys.lenght; ++i) {
13       groups [keys[i]].sort((v1, v2) => v1[0] - v2[0])
14   }
15   // convert to data
16   const data - keys.map[ run_id -> {
17       const x = groups [ run_id ] .map(v => v[0])
18       const y = groups [ run_id ] .map(v => v[0])
19       return {x, y, [type: 'scalle' , mode: 'lines' , name: run_is}
20   })
21   return {
22       data: data,
23       layout : {
24           autosize: true,
25           font : {
26               size: 9
27           },
```

Delta Steering Per Frame Avg

------- gt-220207-ff-
          yummy-foot 0.03
0.025
0.02
0.015
0.01
0.005
0
        0      100      200      300
           (Eval) Model Clock

FIG. 11

USER INTERFACE FOR OPERATING ARTIFICIAL INTELLIGENCE EXPERIMENTS

BACKGROUND OF THE INVENTION

1. Field of the Invention

Embodiments of the invention relates generally artificial intelligence training systems and methods. More particularly, the invention relates to a user interface for operating, monitoring, running and evaluating artificial intelligence experiments, such as machine learning experiments.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Video game players often desire to improve their game through practice and playing against other players. However, once a game player develops exceptional skills in a given game, the availability of suitable challengers greatly decline. While such players may be able to improve their game by playing against less skilled players, it is usually more helpful to play against a player that can provide a significant challenge.

Many games provide game-provided players that can participate. However, these players may simply be following certain programming that a skillful player can figure out and defeat.

In view of the foregoing, there is a need for a user interface, for analyzing model training runs, tracking and visualizing various aspects of machine learning experiments, usable when training an artificial intelligent agent to have the ability to challenge even the best skilled video game players.

SUMMARY OF THE INVENTION

Embodiments of the present invention provide a method for providing a user interface for analyzing model training runs and tracking and visualizing aspects of machine learning experiments, the method comprising displaying a timeline of a selected metric of the machine learning experiment; displaying a video synced to a selected portion of the timeline; and displaying a visualizer shows a global representation from which data is gathered during the machine learning experiment.

Embodiments of the present invention further provide a method for providing a user interface for analyzing model training runs and tracking and visualizing aspects of machine learning experiments, the method comprising displaying a video of a visual representation available in data gathered by a data gatherer of the machine learning experiment; and displaying a visualizer that provides a global representation from which the data is gathered during the machine learning experiment, wherein the visualizer includes one or more event annotations for one or more key events from the machine learning experiment.

Embodiments of the present invention also provide a user interface of a machine learning training system computing architecture for training a racing game artificial agent, the user interface comprising displaying a timeline of a selected metric of the machine learning experiment; displaying a video synced to a selected portion of the timeline; displaying a visualizer shows a global representation from which data is gathered during the machine learning experiment; and displaying one or more event annotations for one or more key events from the machine learning experiment on the visualizer.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

FIG. 1 illustrates an overview page of a user interface, showing a list of resources, active experiments, and finished experiments, according to an exemplary embodiment of the present invention;

FIG. 2 illustrates a screen shot of a user interface according to embodiments of the present invention, showing active experiments, 138 of such active experiments in the example of FIG. 2, running in parallel;

FIG. 3 illustrates how a search bar in the user interface of FIG. 1 can be used to filter experiments, according to an exemplary embodiment of the present invention;

FIG. 4 illustrates a user interface for all completed experiments, which, in the example, of FIG. 4, is 34,921 completed experiments;

FIG. 7 illustrates an experiment overview page of the user interface according to exemplary embodiments of the present invention, showing a list of trainers and data gatherers, that are part of the experiment, below artifacts and videos;

FIGS. 8A and 8B illustrate an exemplary trainer/data gatherer logs page of the user interface according to embodiments of the present invention;

FIG. 11 illustrates a user interface to update a script that populates the widget;

Figure 5:
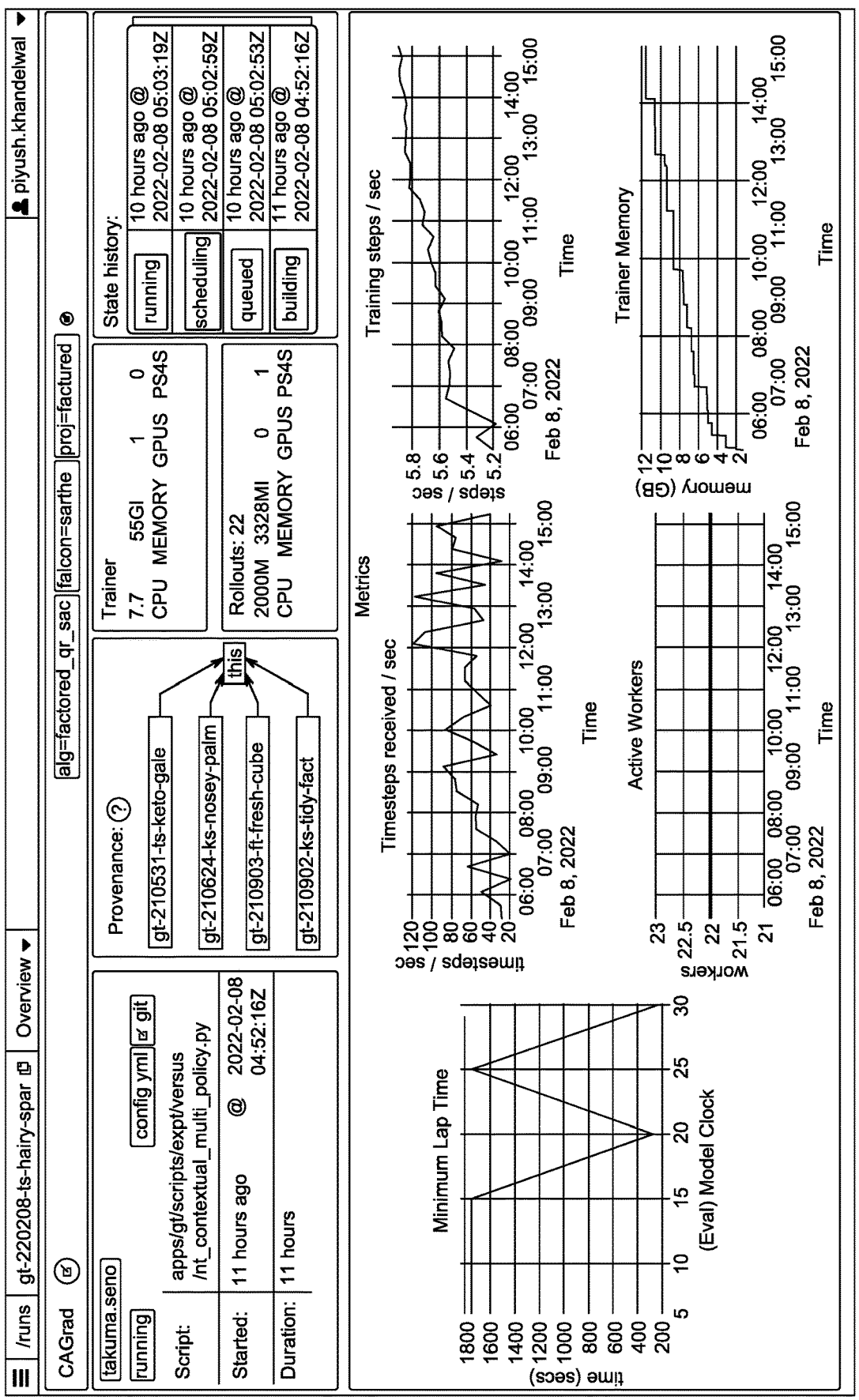
FIG. 5 illustrates an experiment overview page of the user interface according to exemplary embodiments of the present invention, showing key features about the experiment.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

Broadly, embodiments of the present invention provide a user interface, for analyzing model training runs, tracking and visualizing various aspects of machine learning experiments, usable when training an artificial intelligent agent in, for example, a racing game environment. The user interface can be web-based and can allow researchers to easily see the status of their experiments. The user interface can include an experiment synchronized event viewer that can synchronizes visualizations, videos, and timeline/metrics graphs in the experiment. This viewer allows researchers to see how experiments unfold in great detail. The user interface can further include experiment event annotations that can generate event annotations. These annotations can be displayed via the synchronized event viewer.

In some embodiments, the user interface can be used to consider consolidated results across experiments and can further consider videos. For example, the user interface can provide a reusable dashboard that can capture metrics across multiple experiments and compare them; the user interface can provide a graphical representation of how experiments are linked together; and the user interface can be used as a consolidated video player that weaves multiple videos for seamless viewing. More specifically, in some embodiments, the user interface can include the ability to capture videos from a game console in the cloud and display it in the user interface.

As used herein, the term "environment" or "data center" refers to a cluster of resources. In the examples described below, three static environments and one auto scaling environment are described.

As used herein, the term "experiment" refers to a single experiment with a single trainer and multiple data gatherers. It is referred to as a "Run" in most figures.

As used herein, the term "trainer" refers to a single centralized trainer that trains models using data collected by the data gatherers. An experiment typically has one trainer.

As used herein, the term "data gatherer" refers to a distributed worker that collects data. An experiment typically has multiple data gatherers. A data gatherer is represented as a "rollout worker" or "R" in most of the screenshots described herein.

Figure 1:
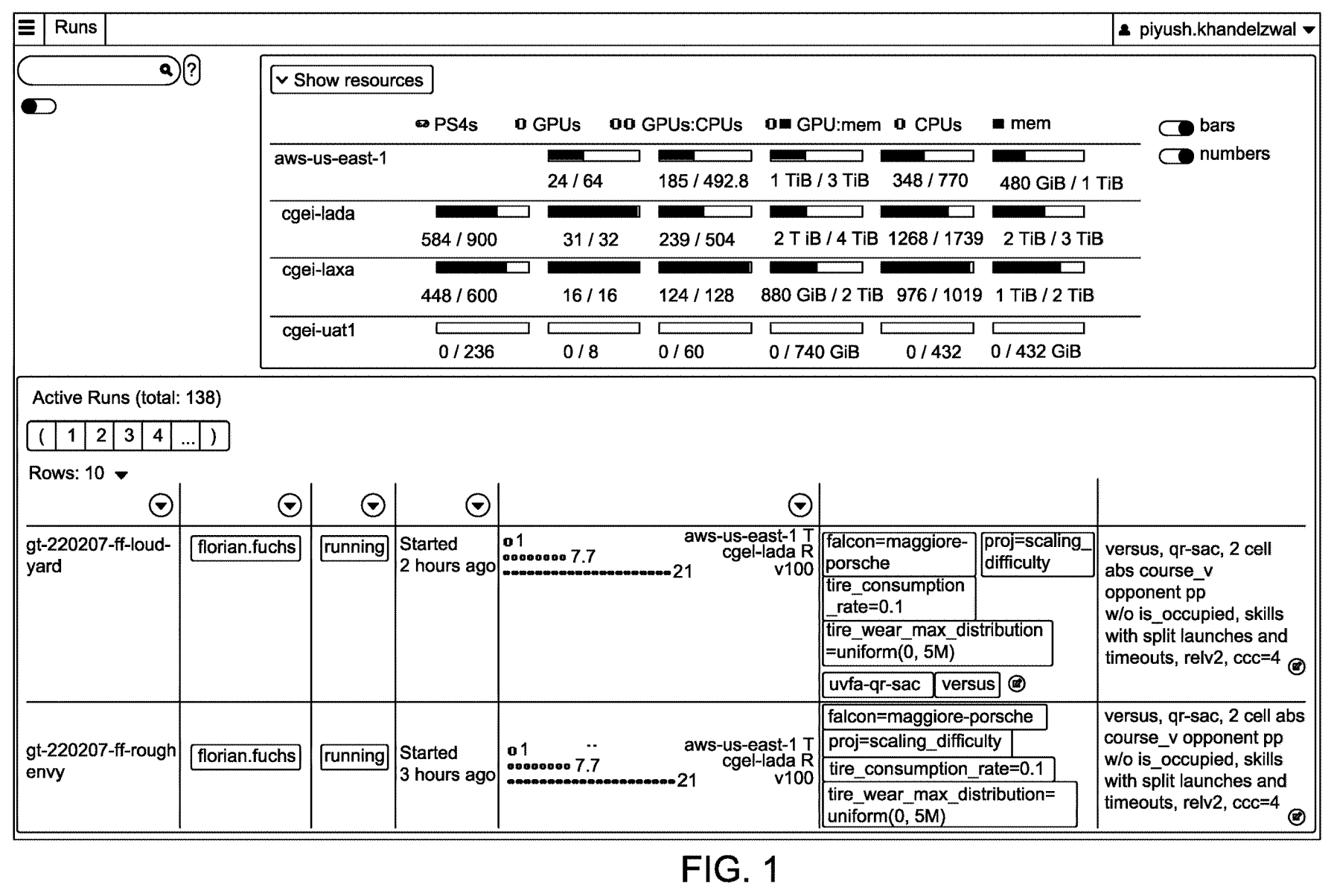
Figure 3:
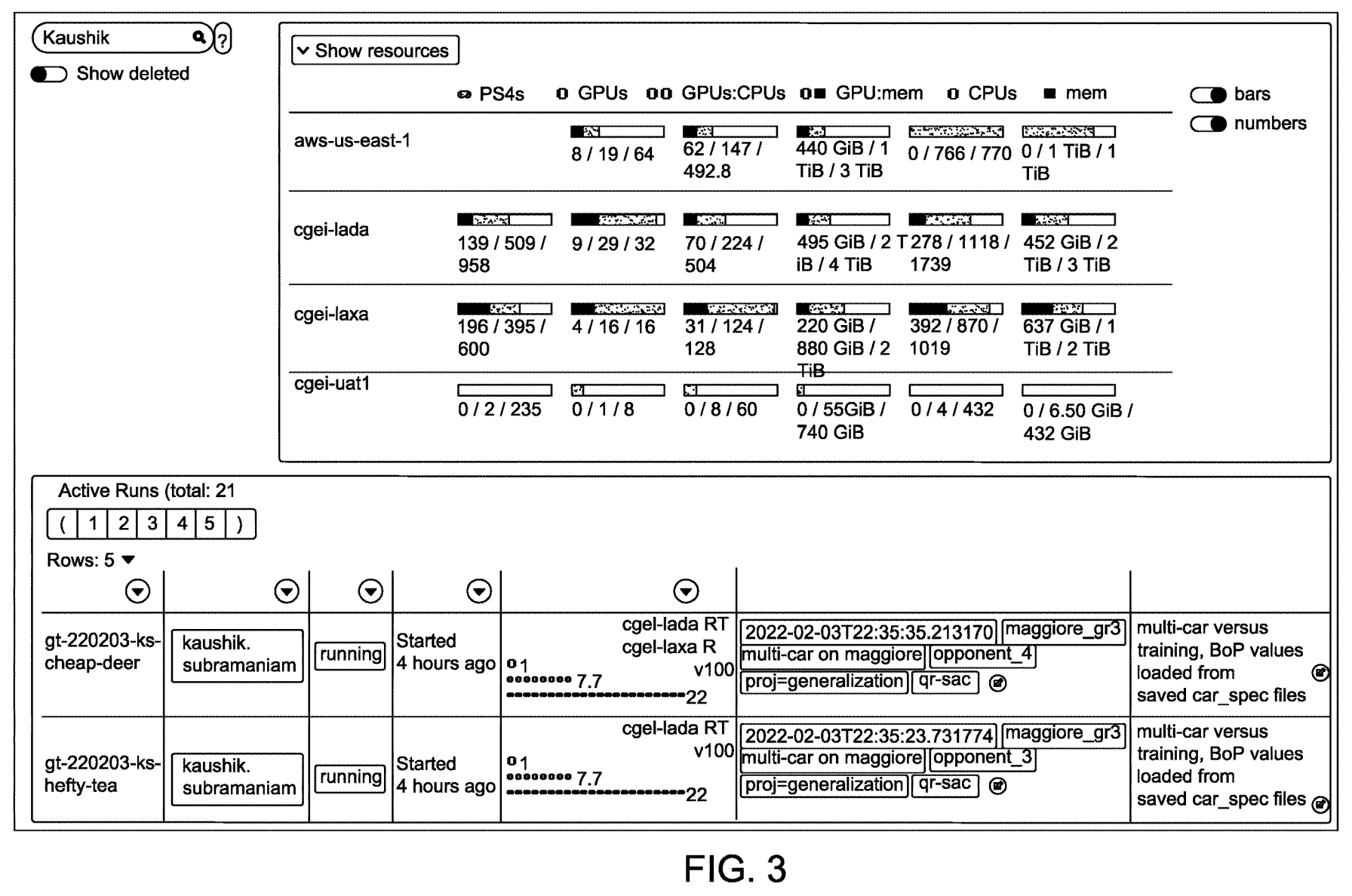

Referring to FIGS. 1 through 3, an upper box 10 shows resources (currently in use/total available) across multiple cloud data-centers/environments available in the user interface system. The resources are shown with the number in use and the total available. In the example of FIG. 1, there are four separate environments, fixed environments 1-3 and an auto scaling environment. From left to right, each environment includes the number of graphics processing units (GPUs), central processing units (CPUs) on GPU machines, memory on GPU machines, CPUs on non GPU machines, and memory on non GPU machines, any one of which may become a bottleneck to starting new experiments. As can be seen in FIG. 1, such resource use can be easily monitored in the user interface according to embodiments of the present invention.

A search bar 12, as discussed in greater detail below with respect to FIG. 3, can be used to filter an experiment list. A lower box 14, as discussed in greater detail below with respect to FIG. 2, shows actively running experiments with pagination.

Referring specifically to FIG. 2, a first column shows the experiment name, with a link to the experiment page, as shown, for example, in FIG. 5 and as discussed in greater detail below. A second column shows the name of the user who submitted the experiment. A third column shows the state of the experiment, which can include states such as (1) Building—images containing user code are being built for the experiment; (2) Queued—an experiment with built images is waiting for resources; or (3) Running—an experiment is actively running in one or many environments and consuming resources. A fourth column shows the time when the experiment started.

A fifth column shows resources used by the experiment, and which environments those resources are coming from. In this column, on the left hand side, the first and second rows can show the number of GPUs and CPUs used by the experiment trainer while the third row shows the number of data gatherers being used in the experiment. Each data gatherer may or may not communicate with a game console, depending on the experiment being run by the user. Some experiments run in simulations that do not require game consoles. A right hand side of the fifth column shows which environments the trainer (T) and the data gatherers (R) are running in. An experiment may be split across multiple environments. For example, the third experiment in FIG. 2 uses resources from three environments. The GPU type being used by the experiment trainer is also displayed and may be either an Nvidia V100 or an Nvidia A100 GPU, for example.

The sixth column of FIG. 2 shows labels used by users to classify runs. Multiple labels may be provided by a single experiment. Labels can be given arbitrary colors by the users. Column seven shows a text description of the experiment.

Referring to FIG. 3, the search bar 14 can allow a user to filter experiments. The user can filter experiments by, for example, a complete or partial experiment name, a complete or partial username for a user who runs experiments, a complete or partial label used by one or many experiments, or a complete or partial description used by one or many experiments. When filtering, the resource view shows the three values per item—resource used by the filtered experiments, resources used by all experiments and all resources available.

Referring to FIG. 4, all completed experiments can be displayed. Typically, these are displayed below active experiments. Typically, the same information as provided for active experiments (discussed above with reference to FIG. 2) can be displayed, except the experiment state can take one of three values: (1) success; (2) error—if an error during experiment execution caused it to fail prematurely; or (3) canceled—a user manually canceled the experiment. The completed experiment display can further provide the total duration of each experiment.

Referring to FIG. 5, an experiment overview page of the user interface is shown. The experiment overview page can show key features about an experiment.

A first portion 50 of the display can show the following: (1) username for user who ran the experiment; (2) the current state of the experiment; (3) a link to display the configuration that ran the experiment (config.yml); (4) a link to the code repository containing the experiment code (git); (5) the script used to run the experiment; (6) the start time of the experiment; and (7) the duration of the experiment. This will differ from the start time once an experiment finishes.

A second portion 52 of the display can show the experiment provenance. The system can easily allow users to use models generated from one experiment in another experiment. This is useful for users since they may need to design the next experiment in a sequence of experiments after analyzing the results of the previous experiment. Each successive experiment is designed independently, as it may not be possible to design it a priori. The user interface can provide an easy graph based representation for users to track and easily navigate to experiments that build on one another and can display experiments that contributed to the current experiment, as well as new experiments that use results from the current experiment. In the screenshot of FIG. 5, models and artifacts from four previous experiments were used in the current one. The user can click on a predecessor or successor run in the graph and open that experiment page. When the list of predecessors is long, a condensed summary may be presented.

A third portion 54A of the display can show the complete resources used by the experiment trainer. This includes the number of CPUs, number of GPUs, and system memory. If the trainer itself is directly interacting with game consoles, then that number is also displayed. Typically, a trainer does not interact with a game console directly but has the ability to do so if necessary.

A fourth portion 54B shows the complete resources used by a single data gatherer and the number of such data gatherers. This includes the number of CPUs, number of GPUs, and system memory. If the data gatherer interacts with game consoles, then that number of game consoles a single data gatherer interacts with is also displayed. Each data gatherer may or may not communicate with a game console, depending on the experiment being run by the user. Some experiments run in simulations that do not require game consoles.

A fifth portion 56 shows the state event history for the experiment, and may include states such as building, queued, running, and suspended.

A sixth portion 58 shows the main overview dashboard for the experiment. This portion 58 may be configurable by the user. This overview dashboard displays key metrics that help the user quickly determine how well the experiment is going. As discussed in greater detail below, an experiment may have multiple dashboards, and users can edit dashboards, including the overview one as shown in FIG. 5, which shows five graphs in the overview dashboard.

Figure 6:
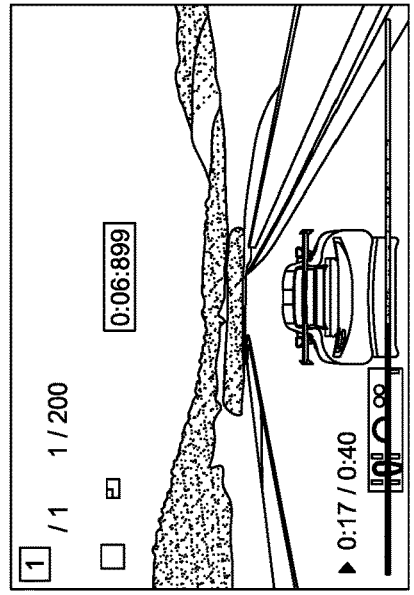
FIG. 6 illustrates an experiment overview page of the user interface according to exemplary embodiments of the present invention, showing artifacts and videos below the overview dashboard.

Referring to FIG. 6, a user can configure an experiment to store arbitrary artifacts—these artifacts can include things like videos, checkpoints, and models. An expandable list of artifacts is displayed on the left hand side of the user interface. It is also possible to search through the list of artifacts.

On the right hand side of the user interface, an optional video player is included. If the experiment saves videos and information about those videos, the user interface can parse this information and display that video. The video can show any visual representation available in the data gathered by data gatherers. This video may be generated by a simulated application being run by a trainer or data gatherer, or it may be the video feed when communicating from a game console.

In addition, the user interface can allow for weaving together information from multiple video sources into a single coherent video stream. For instance, video files are typically chunked in intervals of 2-5 minutes each, and a researcher may need to step across video boundaries for analyzing the experiment. The user interface can allow the user to seamlessly transition from one video to another across video files. The video player may also be viewed on a separate "Experiment Video" page if needed.

Referring to FIG. 7, an experiment overview page can show a list of trainers and data gatherers that are part of the experiment below artifacts and videos. First a list of trainers can be displayed. Typically, there is a single trainer—but an experiment may use more than one trainer. Next a paginated list of data gatherers can be displayed.

Each row contains the following information: (1) the name of the trainer or data gatherer, linking to logs from it (as further discussed below with reference to the logs page); (2) a bar that visually represents how long a trainer or data gatherer is running, as well as when it started and when we last observed it. The bar start and length depends on the total duration of the experiment. If a data gatherer failed halfway during the experiment, then the user interface can start a new data gatherer in its place. The failed data gatherer can occupy the left half of the total bar width, and the new data gatherer can occupy the right half of the total bar width; (3) a text description of the same information in the bar; (4) state of the trainer or data gatherer. Typically the state can be one of "Running", "Failed", or "Canceled"; (5) a complete description of the state; and (6) the environment this trainer or data gatherer is running in.

Figure 8A:
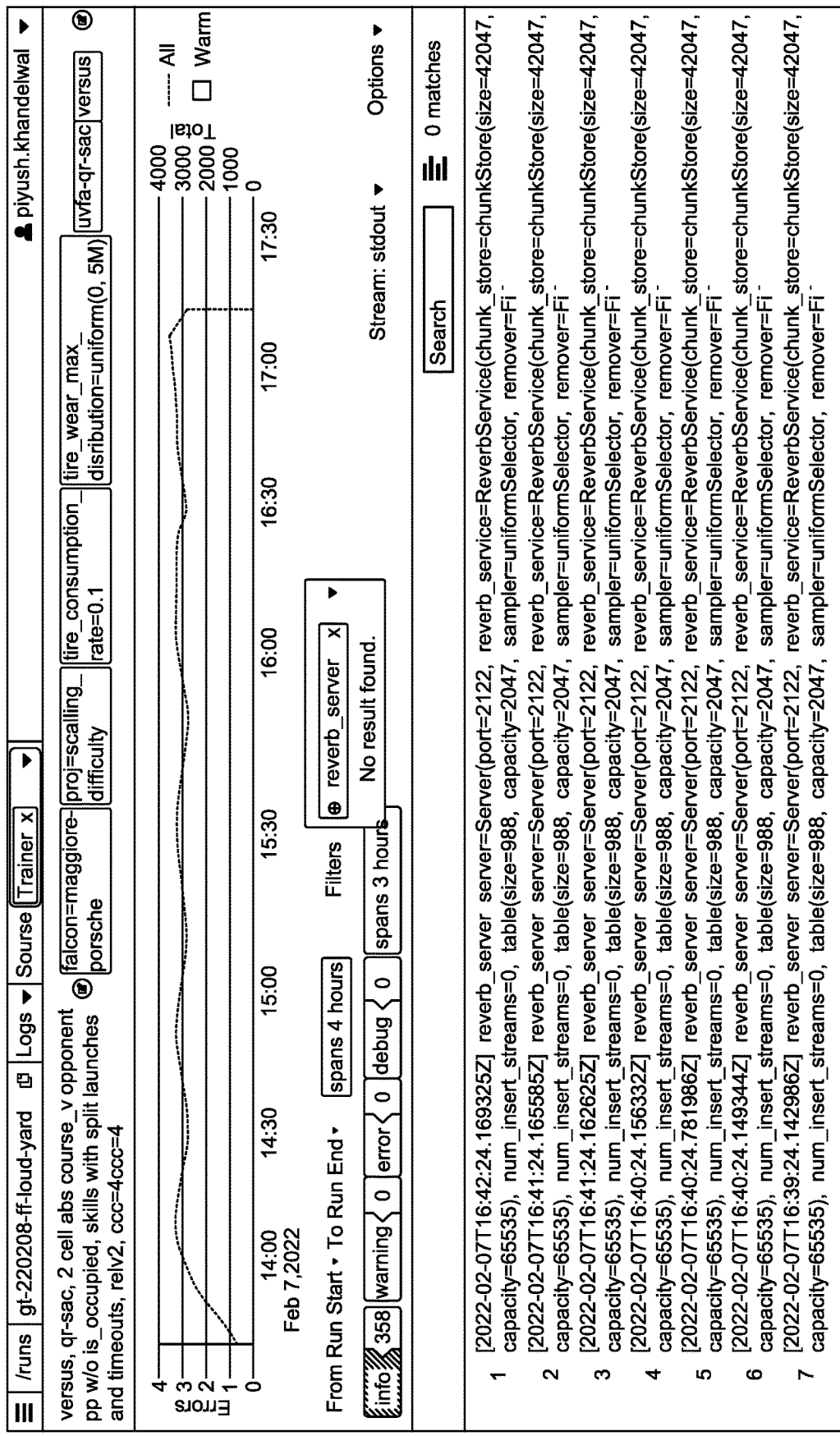

Referring to FIGS. 8A and 8B, a trainer/data gatherer logs page is shown. The trainer or data gatherer logs page shows a list of log lines from that component. The logs page helps users and engineers better analyze experiments via a text record. Some key features of the logs page include (1) the user can select the source of (trainer or a specific data gatherer) from the top of the logs page; (2) the user can specify the duration for which they want to pull logs; (3) the user can also specify an optional filter while pulling the logs. In FIGS. 8A and 8B, a filter called "reverb_server" is applied, which is based on an open-source software by Google®. Other filtering software may be used as appropriate. The logs only include lines where that filter is present. The user interface can also support negated filters, where all lines that do not contain the filter are displayed; and (4) options can be provided that allow specifying how many log lines to pull, and whether to pull/display them in ascending/descending order. Typically, the logs page can auto refresh as more logs are available.

Figure 9:
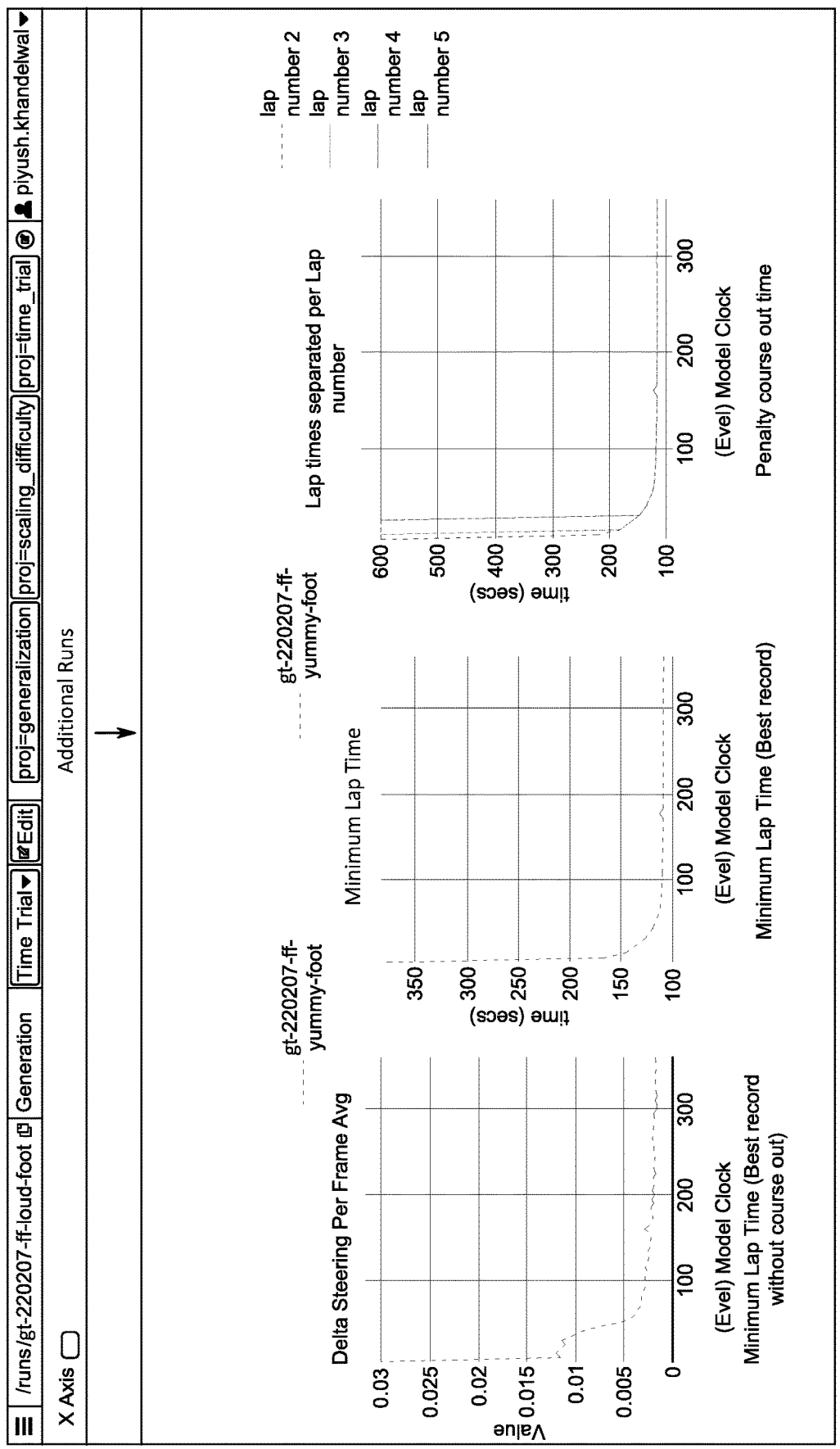
FIG. 9 illustrates an example experiment dashboard page of the user interface according to exemplary embodiments of the present invention.

Referring to FIG. 9, an exemplary experiment dashboard page is shown. An experiment can include one or many dashboards and the user interface can allow a user to create multiple reusable dashboards that can be applied easily to one or multiple experiments. Since a single experiment can have multiple dashboards, each dashboard allows the user to get a different perspective into the experiment.

A dashboard itself can include multiple widgets. Each widget may display the following: (1) graph representation of metrics recorded by the experiment; (2) a table containing summary information from the run; and (3) text that the user wants to display there.

Figure 10:
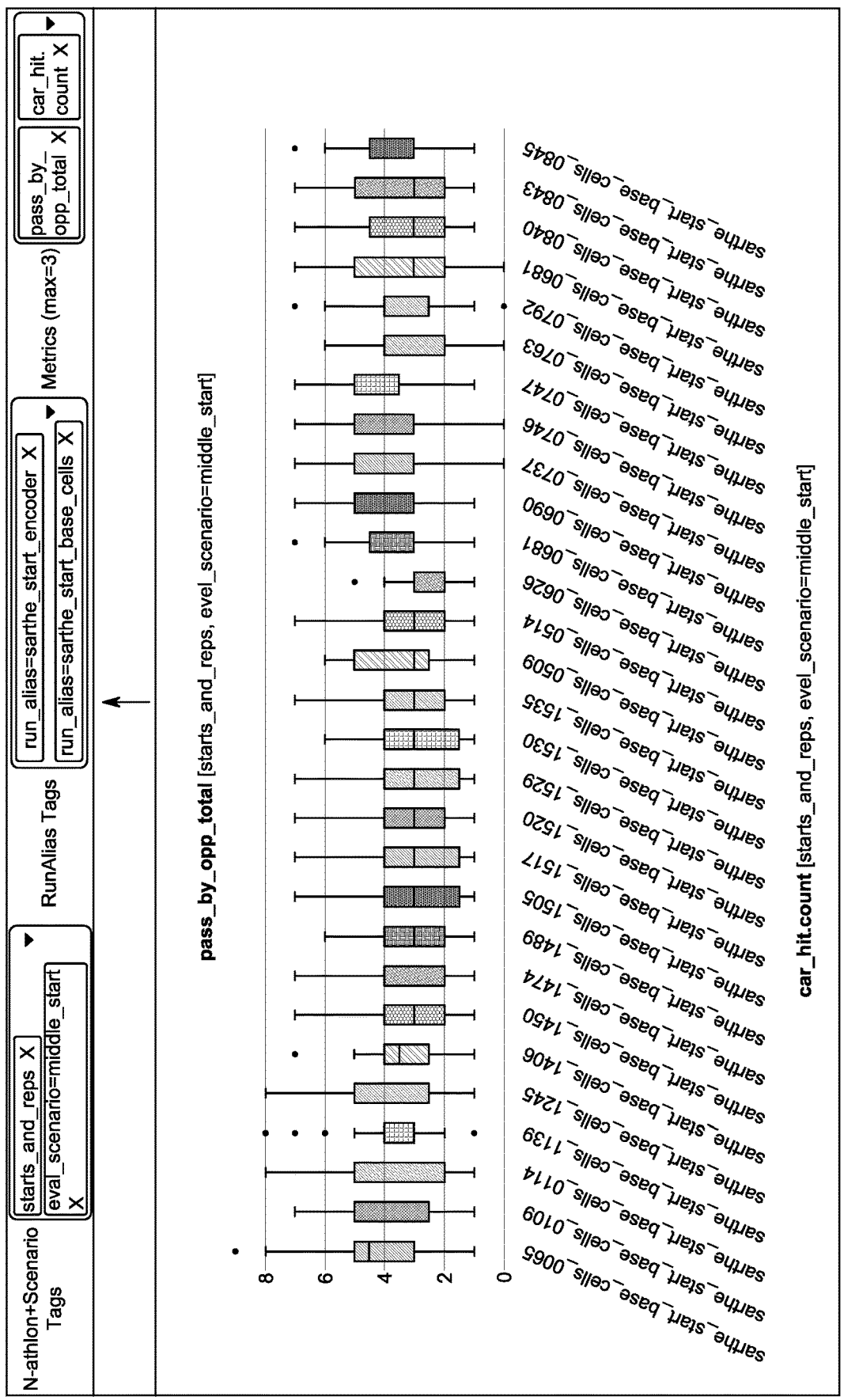
FIG. 10 illustrates an exemplary dashboard with controls for comparing multiple experiments and metrics.

A dashboard can also allow the user to set up a dropdown "control". A user may use one or many controls to choose experiment names, experiment labels, and metric names. These controls provide interactivity in the dashboard, allowing a user to dynamically compare different experiments and different metrics on demand. An example of a controlled dashboard is show in FIG. 10.

Each widget can be driven by a user script, which allows the user to control the widget easily. FIG. 11 shows a screenshot of a user editing a script that controls a specific widget.

Figure 12:
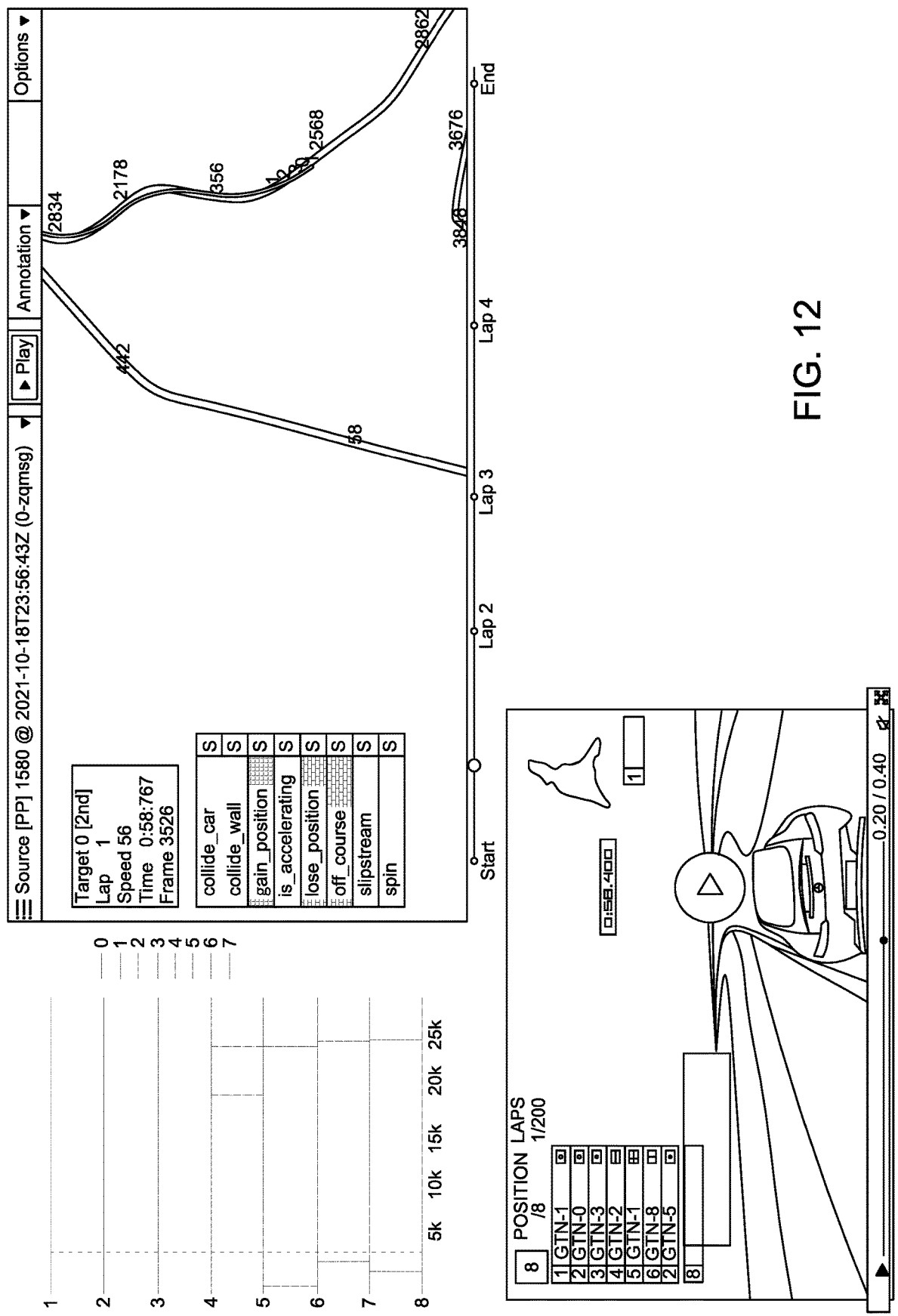
FIG. 12 illustrates an experiment synchronized event viewer of the user interface according to an exemplary embodiment of the present invention.

Referring to FIG. 12, an experiment synchronized event viewer is shown. The video from the video player explained above with respect to FIG. 6 can also be embedded in a separate synchronized viewer page, so that metrics, visualizations, and video can be synced up to the timeline of events, as illustrated in FIG. 12. This feature provides researchers with a synchronized comprehensive view of the data gathered in an experiment.

In this view, (1) the video on the bottom-left provides a specific view. In this specific example of a racing game, the video shows the video from a specific vehicle, and any vehicle in the gathered data can be selected; (2) the visualization on the top-right provides a global view. The visualizer shows a global representation of the application from which data was gathered during the experiment. In this specific example of a racing game, a representation of the course, eight vehicles, and their trajectories are shown. Event annotations can also be displayed on this visualization as detailed below; (3) both video and visualization are synchronized to a timeline on the top left. In this specific example of a racing game, this timeline shows vehicle positions. In the general case, the timeline could display any arbitrary metric or event annotation from the experiment over time. The user can navigate to a moment in time by clicking on the timeline. Combining synchronized experiment visualization, video, and metrics provides in-depth analysis in a machine learning user interface.

Figure 13:
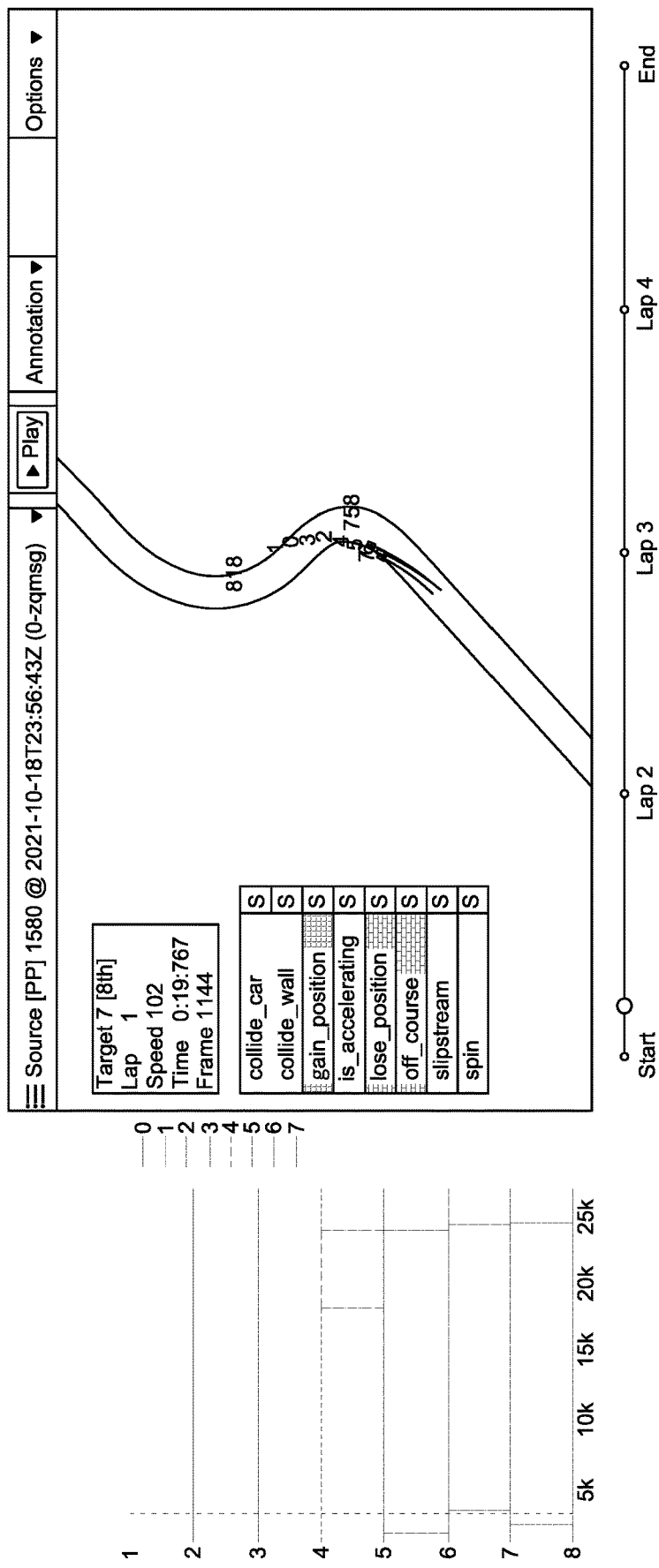
FIG. 13 illustrates an exemplary visualizer from FIG. 12, in an example racing game, before a vehicle (vehicle 7) goes off road.
Figure 14:
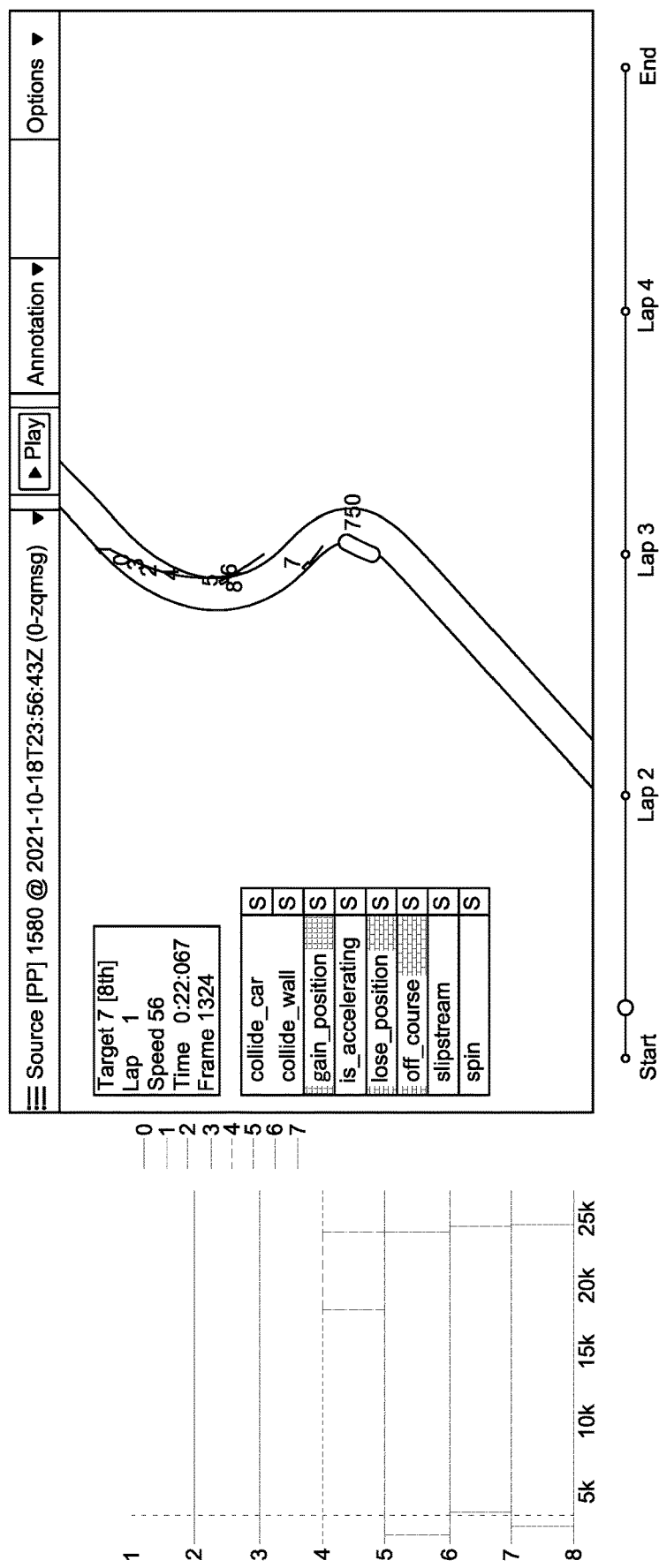
FIG. 14 illustrates the visualizer of FIG. 13, after vehicle 7 goes off road, showing a small colored spheres as an event annotations to indicate an off road event.

Referring to FIGS. 13 and 14, in addition, the user interface system can analyze the experiment even further and generate event annotations. After an experiment is complete, key events in the data stream can be illustrated. In a racing game, key events may look like the following: position gained, position lost, car is off course, or the like. However, events can be generated for any data stream being collected by a data gatherer for any application. Event annotations can then be displayed on the visualizer.

On the visualizer on the top right, there is shown various event annotations in time. In the racing game example, FIGS. 12 and 13 show before and after vehicle 7 goes off road, respectively. FIG. 13 can show the offroad event annotation in the visualization via specifically colored sphere, for example. Other events can be similarly visualized.

The user interface described above may be used in systems that train machine learning models, such as a racing game artificial intelligent player. The user interface may be part of a training system computing architecture as described, for example, in U.S. patent application Ser. No. 17/650,275, the contents of which are herein incorporated by reference.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

The invention claimed is:

1. A method for providing a user interface for analyzing model training runs and tracking and visualizing aspects of machine learning experiments, the method comprising:
displaying a timeline of a selected metric of the machine learning experiments;
displaying resources used across multiple cloud environments for running the machine learning experiments;
displaying a video synced to a selected portion of the timeline;
displaying a visualizer that shows a global representation from which data is gathered during the machine learning experiments, wherein the visualizer includes one or more event annotations for one or more key events from the machine learning experiments; and
displaying an experiment dashboard page with one or more dashboards, wherein the one or more dashboards are user-created dashboards that are applicable to a single experiment or to multiple experiments, wherein the one or more dashboards capture and compare metrics across multiple experiments, wherein
the resources include one or more of a number of graphics processing units (GPUs), a number of central processing units (CPUs) on GPU machines, memory resources on GPU machines, a number of CPUs on non GPU machines, and memory resources on non GPU machines.

2. The method of claim 1, wherein the video is generated by a simulated application being run by a trainer or a data gatherer.

3. The method of claim 1, wherein the video is a video feed when communicating from a cloud-based game console.

4. The method of claim 1, wherein the video includes information from multiple video sources weaved together into a single coherent video stream.

5. The method of claim 1, wherein the machine learning experiment is in a racing game environment.

6. The method of claim 5, wherein the video shows a vehicle video from a selected vehicle participating in the racing game.

7. The method of claim 5, wherein the visualizer shows a representation of a racing course, each racing vehicle, and a trajectory of each racing vehicle.

8. The method of claim 5, wherein the timeline shows vehicle positions in the racing game environment.

9. The method of claim 1, wherein the one or more key events include racing game key events including one or more of position gained, position lost, or car is off course.

10. A user interface of a machine learning training system computing architecture for training a racing game artificial agent, the user interface comprising:
displaying a timeline of a selected metric of a machine learning experiment;
displaying resources used across multiple cloud environments for running the machine learning experiment;
displaying a video synced to a selected portion of the timeline;
displaying a visualizer shows a global representation from which data is gathered during the machine learning experiment;
displaying one or more event annotations for one or more key events from the machine learning experiment on the visualizer; and
displaying an experiment dashboard page with one or more dashboards, wherein the one or more dashboards are user-created dashboards that are applicable to a single experiment or to multiple experiments, wherein the one or more dashboards capture and compare metrics across multiple experiments, wherein
the resources include one or more of a number of graphics processing units (GPUs), a number of central processing units (CPUs) on GPU machines, memory resources on GPU machines, a number of CPUs on non GPU machines, and memory resources on non GPU machines.

* * * * *